United States Patent
Vice

(12) United States Patent (10) Patent No.: US 11,975,814 B2
Vice (45) Date of Patent: May 7, 2024

(54) SYSTEM AND METHOD TO ACTIVELY MORPH AN AIRCRAFT WHILE IN FLIGHT FOR SONIC BOOM SUPPRESSION AND DRAG MINIMIZATION

(71) Applicant: Boeing Ace Collateral Agent, LLC, Arlington, VA (US)

(72) Inventor: Tom Vice, Palo Alto, CA (US)

(73) Assignee: Boeing Ace Collateral Agent, LLC, Arlington, VA (US)

( * ) Notice: Subject to any disclaimer, the term of this patent is extended or adjusted under 35 U.S.C. 154(b) by 24 days.

(21) Appl. No.: 17/563,125

(22) Filed: Dec. 28, 2021

(65) Prior Publication Data

US 2022/0289360 A1 Sep. 15, 2022

Related U.S. Application Data

(60) Provisional application No. 63/109,627, filed on Nov. 4, 2020.

(51) Int. Cl.
*B64C 1/38* (2006.01)
*B64C 1/06* (2006.01)
*B64C 30/00* (2006.01)

(52) U.S. Cl.
CPC .............. *B64C 1/38* (2013.01); *B64C 1/0683* (2020.01); *B64C 30/00* (2013.01); *B64C 2220/00* (2013.01)

(58) Field of Classification Search
CPC ..... B64C 30/00; B64C 3/48; B64C 2003/149; B64C 2003/445; B64C 2003/543
See application file for complete search history.

(56) References Cited

U.S. PATENT DOCUMENTS

| | | | | |
|---|---|---|---|---|
| 2,995,320 A | * | 8/1961 | Gottschalk | B64C 30/00 244/76 R |
| 3,596,852 A | * | 8/1971 | Wakefield | B64C 30/00 244/1 N |
| 5,358,156 A | * | 10/1994 | Rethorst | B64C 30/00 244/45 R |
| 5,681,013 A | * | 10/1997 | Rudolph | B64C 9/24 244/214 |
| 5,740,984 A | * | 4/1998 | Morgenstern | B64C 30/00 244/1 N |
| 6,464,171 B2 | * | 10/2002 | Ruffin | B64C 30/00 244/210 |
| 6,883,806 B2 | | 4/2005 | Guzzardo | |
| 2005/0051666 A1 | * | 3/2005 | Lee | B64C 17/10 244/10 |

(Continued)

OTHER PUBLICATIONS

Estridge. "System Architecture and Inputs: F-14 Wing Sweep". Robot Mechanism Design—UT Austin Wikis. [online]. May 8, 2020; [Retrieved on Sep. 6, 2022]. Retrieved from <url:https://wikis.utexas.edu/display/RMD/2.+System+Architecture+and+Inputs%3A+F-14+Wing+Sweep>.

(Continued)

*Primary Examiner* — Richard Green
*Assistant Examiner* — Colin Zohoori
(74) *Attorney, Agent, or Firm* — HANLEY, FLIGHT & ZIMMERMAN, LLC

(57) ABSTRACT

A system that optimizes the shape or configuration of an aircraft to minimize ground overpressure shock strength while in supersonic flight over speed restricted terrain and to morph to an optimized configuration for drag minimization while over unrestricted terrain.

20 Claims, 2 Drawing Sheets

(56) References Cited

U.S. PATENT DOCUMENTS

| | | | | |
|---|---|---|---|---|
| 2005/0098681 A1* | 5/2005 | Berson | ................ | G08G 5/0052 |
| | | | | 244/1 N |
| 2005/0116116 A1* | 6/2005 | Morgenstern | ............ | B64C 9/36 |
| | | | | 244/214 |
| 2005/0224630 A1 | 10/2005 | Henne et al. | | |
| 2005/0230531 A1 | 10/2005 | Horinouchi | | |
| 2007/0262207 A1* | 11/2007 | Morgenstern | ........... | B64C 23/04 |
| | | | | 244/214 |
| 2014/0224927 A1* | 8/2014 | Freund | ...................... | B64C 9/00 |
| | | | | 244/1 N |
| 2019/0137326 A1* | 5/2019 | Suddreth | ................ | G01H 17/00 |
| 2019/0291884 A1* | 9/2019 | Mackin | ................. | B64D 47/08 |
| 2021/0233413 A1* | 7/2021 | Holloway | ............ | G08G 5/0052 |
| 2021/0323656 A1* | 10/2021 | Shmilovich | ............... | B64C 3/26 |
| 2021/0339876 A1* | 11/2021 | Melendez | ............... | B64C 13/16 |
| 2022/0165164 A1* | 5/2022 | Salamone, III | ......... | B64C 30/00 |
| 2023/0056909 A1* | 2/2023 | Gusman | ................ | B64D 31/06 |

OTHER PUBLICATIONS

Wikipedia. "Lockheed Martin X-59 QueSST." <https://en.wikipedia.org/wiki/Lockheed_Martin_X-59_QueSST> Sep. 6, 2022.
International Search Report and Written Opinion in related PCT Application PCT/US21/65288 dated Sep. 28, 2022, 15 pages.

\* cited by examiner

SYSTEM AND METHOD TO ACTIVELY MORPH AN AIRCRAFT WHILE IN FLIGHT FOR SONIC BOOM SUPPRESSION AND DRAG MINIMIZATION

RELATED APPLICATION

This patent application claims priority benefit with regard to all common subject matter, of earlier-filed U.S. Provisional Patent Application Ser. No. 63/109,627, filed on Nov. 4, 2020, and entitled "SYSTEM TO ACTIVELY MORPH AN AIRCRAFT IN REAL TIME WHILE IN SUPERSONIC FLIGHT TO AND FROM TWO OPTIMIZED STATES—1) OPTIMIZED STATE FOR SONIC BOOM GROUND OVERPRESSURE MINIMIZATION AND 2) OPTIMIZED STATE FOR DRAG MINIMIZATION FOR MAXIMUM RANGE PERFORMANCE" which is hereby incorporated by reference in its entirety into the present application.

FIELD OF THE INVENTION

Embodiments of the current invention relate to supersonic aircraft systems that modify features of an aircraft in real time to actively trade drag for sonic boom suppression.

BACKGROUND

Supersonic aircraft are capable of flying at speeds greater than the speed of sound. While an aircraft is flying faster than the speed of sound (i.e., supersonic flight), it generates pressure waves that create a sonic boom. If not managed properly, sonic booms may be disruptive to persons or property on the surface, and in some countries flight faster than the speed of sound over land is prohibited. Using certain existing design techniques, the sonic boom can be minimized, however, at the sacrifice of increased drag and reduced aircraft range performance. Typically, the aircraft body is designed to minimize drag, such as wave drag, drag due to lift, or others, during supersonic flight—given that high drag reduces aircraft flight range and/or increases fuel consumption. Unfortunately, low drag supersonic designs may result in the ground overpressure created from the sonic boom being strong enough to be disruptive to persons and property.

SUMMARY

Embodiments of the current invention solve the above-mentioned problems and provide a distinct advance in the art of supersonic aircraft travel. Embodiments of the invention shape or otherwise modify features of various aircraft structures, such as nose sections, fuselage sections, wing sections, and tail sections, either individually or in combination, to suppress the sonic boom at ground level at the cost of increasing drag. The area distribution of structures required for sonic boom minimization is not the same as that required for drag minimization. For example, boom minimization requires a more rapid buildup of volume at the nose of the aircraft while the nose bluntness incurs a drag penalty.

An embodiment of the current invention is a system that optimizes in real time the configuration of an aircraft to minimize the ground overpressure shock strength while in supersonic flight over speed restricted terrain and morphs to an optimized configuration for drag minimization while over unrestricted terrain. The system includes active surfaces that manage and morph the shape or other configuration of the aircraft and the lengthwise lift and volume distributions in flight to minimize the shocks from coalescing into the N wave while over land. When the active surfaces are deployed, there will be drag implications and range will be affected. However, the system only deploys these surfaces when over speed restricted terrain, such as land, and any associated range reductions can be calculated and accounted for in flight plans. When over unrestricted terrain, such as water, all the surfaces will be retracted or otherwise modified to minimize drag and increase range. Thus, the system actively manages characteristics of the aircraft while in flight—optimizing area distribution and lift contributions for boom suppression while over land and optimizing area distribution for drag while over water. With this configuration, an initial overpressure of 0.4 lb./ft2 or less at ground level may be achieved.

The system broadly comprises an aircraft shape change apparatus and a flight management controller. The aircraft shape change apparatus is configured to actively control a shape or configuration of the aircraft to have a first shape or configuration for reducing the sonic boom at ground level, a second shape or configuration for reducing drag on the aircraft, and a third shape or configuration that is in between the first shape or configuration and the second shape or configuration. In other embodiments, the aircraft shape change apparatus may incrementally change the shape or configuration of the aircraft to enable any number of shapes or configurations between the first shape or configuration and the second shape or configuration.

The flight management controller is configured to manage an operation of the aircraft and to generate an electronic apparatus signal and send it to the aircraft shape change apparatus. The aircraft shape change apparatus receives the electronic apparatus signal from the flight management controller and adjusts the shape of the aircraft between the shapes described above according to a content of the apparatus signal.

An embodiment of the flight management controller includes a processing element and a memory. The processing element is configured or programmed to output the electronic apparatus signal to include a first content for adjusting the aircraft to have the first shape or configuration when the aircraft is flying over an area in which a ground level sonic boom is not permitted, a second content for adjusting the aircraft to have the second shape or configuration when the aircraft is flying over an area in which a ground level sonic boom is permitted, and a third content for adjusting the aircraft to have the third shape or configuration when the aircraft is approaching a border between an area in which a ground level sonic boom is not permitted and an area in which a ground level sonic boom is permitted.

Another embodiment of the present invention is a method of morphing the shape or other configuration of an aircraft while the aircraft is in flight to optimize the aircraft for either sonic boom suppression or drag reduction. The method comprises the step of receiving in a processing element data representative of a sonic boom property of an area over which the aircraft is flying. The data may include data representative of a location of the aircraft, and the sonic boom property may be an indication of whether a sonic boom is permitted over the location.

The method further comprises the step of determining with the processing element a desired aircraft state based on the received data. For example, if the received data indicates the aircraft is over a location that does not permit a sonic boom, the processing element determines the aircraft should be in a state corresponding to the first shape or configuration described above to suppress or minimize sonic booms. Conversely, if the received data indicates the aircraft is over a location that does permit a sonic boom, the processing element determines the aircraft should be in a state corresponding to the second shape or configuration described above to minimize drag. If the received data indicates the aircraft is over a location that does not permit a sonic boom but is approaching a location that does permit a sonic boom or is over a location that does permit a sonic boom but is approaching a location that does not permit a sonic boom, the processing element determines the aircraft should be in a state corresponding to the third shape or configuration described above. The method further comprises the step of instructing an aircraft shape change apparatus to adjust a shape or other configuration of the aircraft to achieve the desired aircraft state.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

Embodiments of the current invention are described in detail below with reference to the attached drawing figures, wherein.

Figure 1:
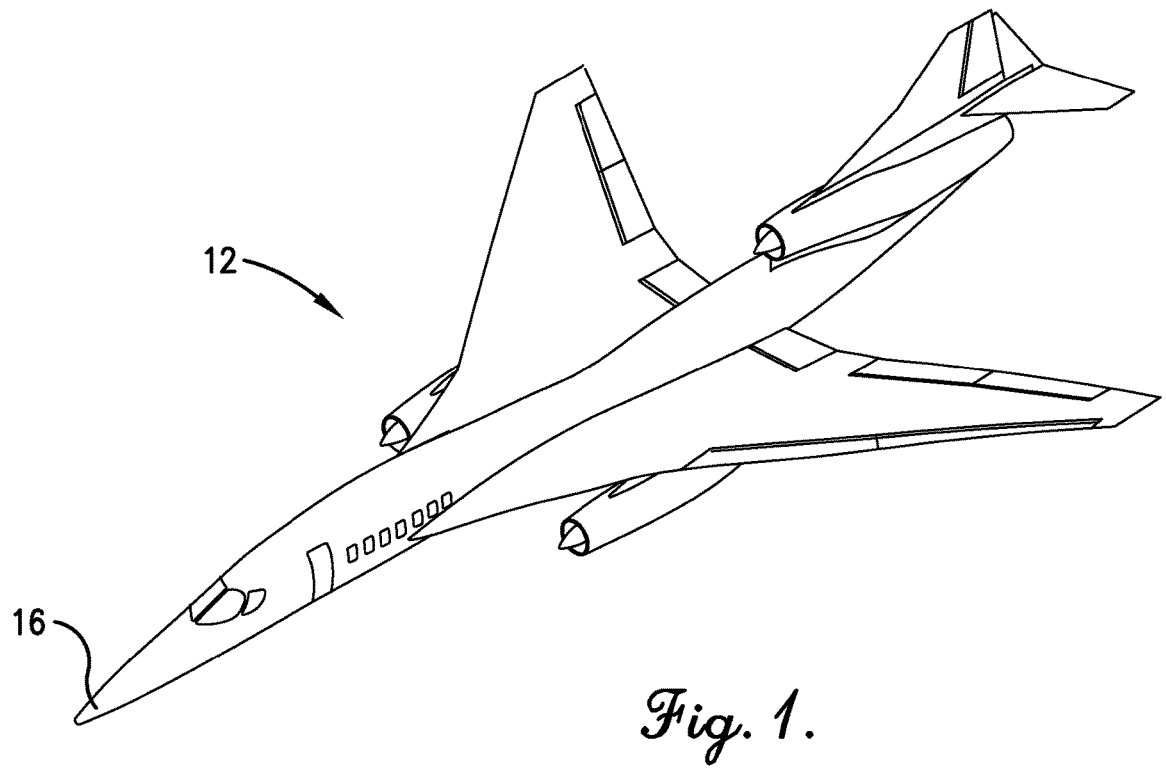
FIG. 1 is a forward perspective view of an aircraft equipped with a system for reducing a sonic boom at ground level, constructed in accordance with various embodiments of the current invention.

The drawing figures do not limit the current invention to the specific embodiments disclosed and described herein. The drawings are not necessarily to scale, emphasis instead being placed upon clearly illustrating the principles of the invention.

DETAILED DESCRIPTION

Figure 2:
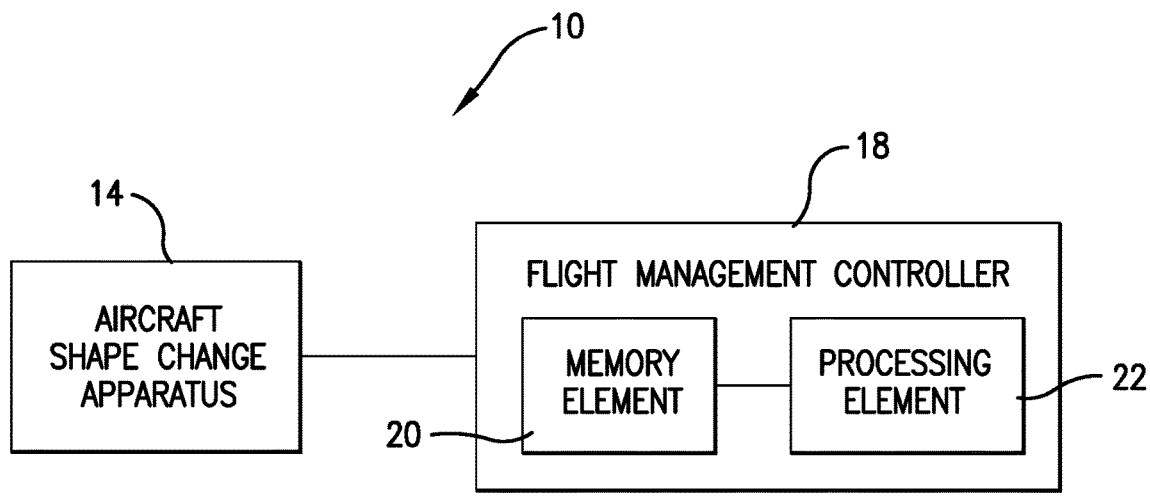
FIG. 2 is a schematic block diagram of the system including an apparatus for changing a shape of the aircraft and a flight management controller.

Referring to FIGS. 1 and 2, a system 10 that optimizes the configuration of an aircraft 12 is shown. The system 10 broadly comprises an aircraft shape change apparatus 14 for actively controlling a shape or configuration of one or more structures 16 of the aircraft 12 and a flight management controller 18. Exemplary structures 16 of the aircraft 12 include forward structures, such as a nose or nose section, as shown in FIG. 1. Other structures may include fuselage sections, wing sections, aft or tail sections, and the like. The shape, volume, or other configuration, characteristic, or feature of the structure 16 is controllable, adjustable, malleable, or deformable to have a first shape or configuration, in which the sonic boom at the ground level is minimized, reduced, or suppressed while a drag on the aircraft 12 is increased, a second shape or configuration, in which the sonic boom at the ground level may increase while the drag of the aircraft 12 is minimized or reduced, and a third shape or configuration that includes a plurality of shapes or configurations between the first shape and the second shape. In various embodiments, the shape or configuration of the structure 16 may be blunter, or flatter, in the first shape or configuration and less blunt, or more pointed, in the second shape or configuration. The first shape may also actively control the area distribution of the structure 16, the shape of the aircraft 12, and the lift of the aircraft 12. In other embodiments, the shape, configuration, or other characteristic of the structure is controllable to have any number of shapes, configurations, or states between the first and second shapes or configurations.

The aircraft shape change apparatus 14 includes devices and mechanisms, such as actuators, motors, cams, hydraulic components, pneumatic components, and the like, which extend or push, retract or pull, apply positive or negative pressure, translate, rotate, and so forth. The aircraft shape change apparatus 14 may also include surfaces whose shape, contour, area, or volume can be controlled, changed, varied, or adjusted. The aircraft shape change apparatus 14 may further include shaped metal alloys, blade seals, or other mechanisms which can be extended and retracted. In other embodiments, the aircraft shape change apparatus 14 may include materials or structures which can change, alter, or morph, or be controlled or acted upon to change, alter or morph, their physical structure through physical or chemical reactions.

The aircraft shape change apparatus 14 selectively adjusts the structure 16 and operates in a first state, in which the apparatus 14 adjusts the structure 16 to have the first shape or configuration, a second state, in which the apparatus 14 adjusts the structure 16 to have the second shape or configuration, and a third state, in which the apparatus 14 adjusts the structure 16 to have the third shape or configuration.

The devices and mechanisms of the aircraft shape change apparatus 14 receive an electronic apparatus signal which includes content such as an analog electric voltage or electric current level that is variable, a pulse-width modulated stream, and/or digital data that varies. The apparatus signal places the apparatus 14 in one of the three states, varying according to, or depending on, the level, the pulse width, or a data value of the apparatus signal. For example, the apparatus signal having a first level, pulse width or data value places the apparatus 14 in the first state. The apparatus signal having a second level, pulse width or data value places the apparatus 14 in the second state. The apparatus signal having a third level, pulse width or data value places the apparatus 14 in the third state.

The flight management controller 18 generally manages an operation of the aircraft 12, specifically navigation and mechanical systems of the aircraft 12, and generates the electronic apparatus signal that triggers the shape or configuration changes made by the aircraft shape change apparatus. The flight management controller 18 includes a memory element 20 and a processing element 22.

The memory element 20 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, solid state memory, cloud-based storage, or the like, or combinations thereof. In some embodiments, the memory element 20 may be embedded in, or packaged in the same package as, the processing element 22. The memory element 20 may include, or may constitute, a non-transitory "computer-readable medium". The memory element 20 may store the instructions, code, code statements, code segments, software, firmware, programs, applications, apps, services, daemons, or the like that are executed by the processing element 22. The memory element 20 may also store data that is received by the processing element 22 or the device in which the processing element 22 is implemented. The processing element 22 may further store data or intermediate results generated during processing, calculations, and/or computations as well as data or final results after processing, calculations, and/or computations. In addition, the memory element 20 may store settings, data, documents, databases, and the like.

The processing element 22 may comprise one or more processors. The processing element 22 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 22 may generally execute, process, or run instructions, code, code segments, code statements, software, firmware, programs, applications, apps, processes, services, daemons, or the like. The processing element 22 may also include hardware components such as registers, finite-state machines, sequential and combinational logic, configurable logic blocks, and other electronic circuits that can perform the functions necessary for the operation of the current invention. In certain embodiments, the processing element 22 may include multiple computational components and functional blocks that are packaged separately but function as a single unit. In some embodiments, the processing element 22 may further include multiprocessor architectures, parallel processor architectures, processor clusters, and the like, which provide high performance computing. The processing element 22 may be in electronic communication with the other electronic components through serial or parallel links that include universal busses, address busses, data busses, control lines, and the like.

In some embodiments, the processing element 22 may be located entirely within the aircraft 12. In other embodiments, some portions of the processing element 22 may be located within the aircraft 12 while other portions of the processing element 22 may be located outside the aircraft 12, such as in ground stations, so that data processing and computations may be performed in multiple locations with the results being communicated to the processing element 22 on the aircraft 12.

The processing element 22 may be operable, configured, or programmed to perform the following functions by utilizing hardware, software, firmware, or combinations thereof. The processing element 22 may determine, receive, or be in possession of, a flight profile or plan which includes a route that the aircraft will follow, a Mach or speed profile, and an altitude profile.

The processing element 22 receives input data from sensors and other data sources regarding current locations of the aircraft, atmospheric conditions, current velocity and heading, fuel supply, and other parameters from which it updates the flight profile. The sensors may include, for example, a location-determining component that determines current locations of the aircraft. The location-determining component may be any device capable of determining positions of the aircraft. The location-determining component may be a global navigation satellite system (GNSS) receiver such as a GPS receiver, Glonass receiver, Galileo receiver, or other receiver attached to the aircraft. The GNSS receiver may include one or more processors, controllers, or other computing devices and memory for storing information accessed and/or generated by the processors or other computing devices. The GNSS receiver or receivers may be incorporated in the flight management controller 18 or may be stand-alone devices. Each GNSS receiver may be coupled with a patch antenna, helical antenna, or any other type of antenna.

The location-determining component may also comprise other type of receiving devices capable of receiving location information from at least three transmitting locations and performing basic triangulation calculations to determine the relative position of the receiving device with respect to the transmitting locations.

The processing element 22 outputs the electronic apparatus signal and sets the level, pulse width, or data value to have the first, second, or third level, pulse width, or data value. The processing element 22 may vary the level, pulse width, or data value of the apparatus signal according to the sonic boom properties of the area over which the aircraft 12 is flying and/or one or more input data parameters.

In one embodiment, the processing element 22 sets the level, pulse width, or data value of the electronic apparatus signal to have the first level, pulse width, or data value when the aircraft 12 is flying over an area in which a ground level sonic boom is not permitted. The processing element 22 sets the level, pulse width, or data value of the apparatus signal to have the second level, pulse width, or data value when the aircraft 12 is flying over an area in which a ground level sonic boom is permitted. The processing element 22 sets the level, pulse width, or data value of the apparatus signal to have the third level, pulse width, or data value when the aircraft 12 is approaching a boundary between a first area in which a ground level sonic boom is not permitted and a second area in which a ground level sonic boom is permitted.

The system 10 may operate as follows. The processing element 22 of the flight management controller 18 receives input data from sensors and other data sources from which it updates the flight profile. The processing element 22 determines how to set the level, pulse width, or data value of the apparatus signal based on the parameters discussed above and outputs the apparatus signal accordingly. The aircraft shape change apparatus 14 receives the apparatus signal and adjusts the shape or configuration of the structure 16 of the aircraft 12 to have the first shape or configuration, the second shape or configuration, or the third shape or configuration according to the level, pulse width, or data value of the apparatus signal.

Figure 3:
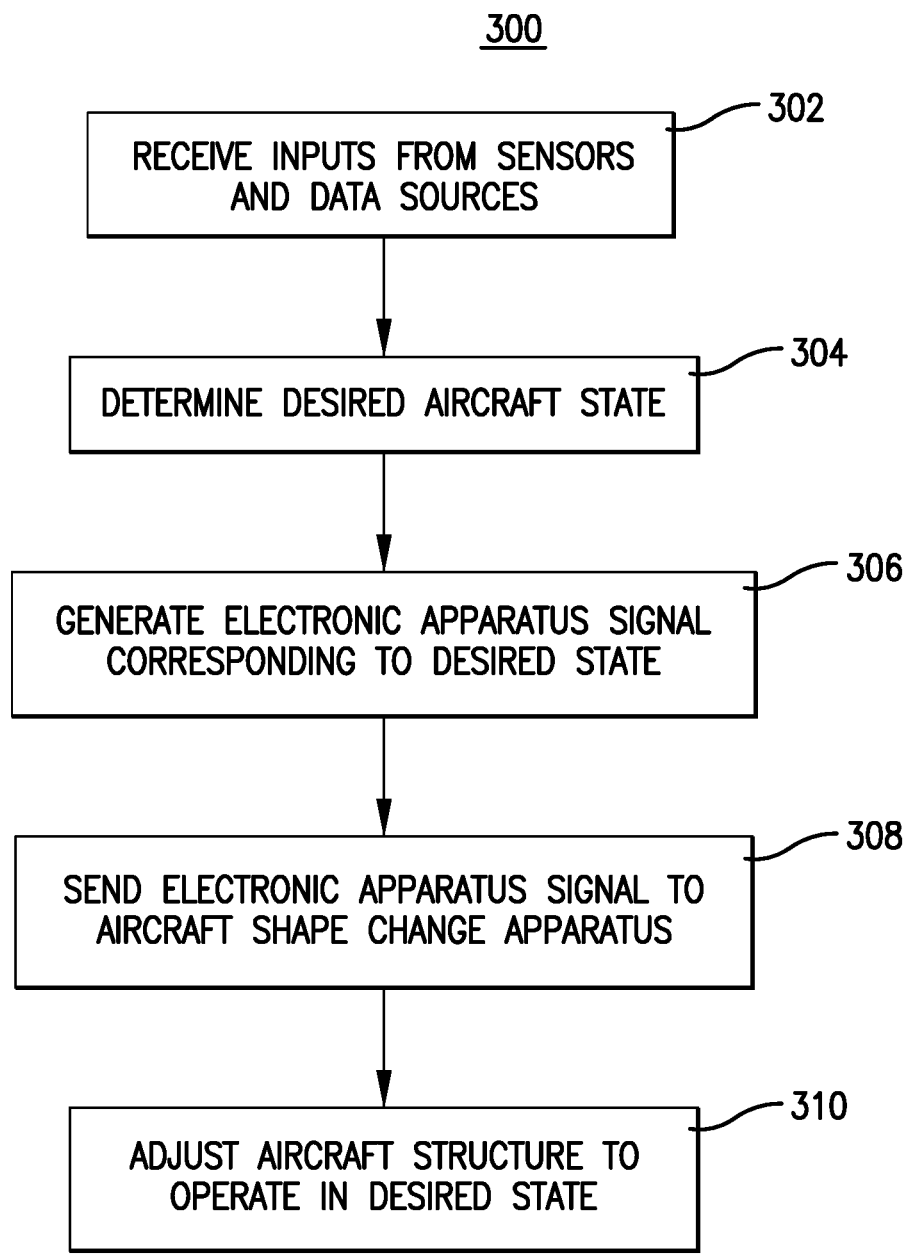
FIG. 3 is a flow diagram depicting exemplary steps in a method of the present invention.

The flow chart of FIG. 3 shows the functionality and operation of a preferred implementation of the present invention in more detail. In this regard, some of the blocks of the flow chart may represent a module segment or portion of code of computer programs of the present invention which comprises one or more executable instructions for implementing the specified logical function or functions. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

In one embodiment, the flow chart of FIG. 3 depicts a method of morphing the shape or other configuration of an aircraft while the aircraft is in flight to optimize the aircraft for either sonic boom suppression or drag reduction. As shown in block 302 of FIG. 3, the method comprises the step of receiving in the processing element 22 or another processing element data representative of a sonic boom property of an area over which the aircraft is flying. The data may be received from one or more sensors that sense or otherwise determine locations of the aircraft, atmospheric conditions, current velocity and heading, fuel supply, and other parameters. In one particular embodiment of the invention, the data is representative of a location of the aircraft. Certain locations may correspond to a sonic boom property that that does not permit a sonic boom, and other locations may correspond to a sonic boom property that does permit a sonic boom. The locations and associated sonic boom properties may be stored in the memory element 20 of the flight management controller 18 or otherwise be available to the flight management controller.

As shown in block 304, the processing element next determines a desired aircraft state based on the received data. For example, if the received data indicates the aircraft is over a location that does not permit a sonic boom, the processing element determines the aircraft should be in a state corresponding to the first shape or configuration described above to suppress or minimize sonic booms. Conversely, if the received data indicates the aircraft is over a location that does permit a sonic boom, the processing element determines the aircraft should be in a state corresponding to the second shape or configuration described above to minimize drag. If the received data indicates the aircraft is over a location that does not permit a sonic boom but is approaching a location that does permit a sonic boom or is over a location that does permit a sonic boom but is approaching a location that does not permit a sonic boom, the processing element determines the aircraft should be in a state corresponding to the third shape or configuration described above or another shape or configuration between the first and second shapes or configurations.

As shown in block 306, the processing element 22 next generates an electronic apparatus signal corresponding to the desired aircraft state. In one embodiment, the processing element 22 sets the level, pulse width, or data value of the apparatus signal to have the first level, pulse width, or data value when the aircraft 12 is flying over an area in which a ground level sonic boom is not permitted. The processing element 22 sets the level, pulse width, or data value of the apparatus signal to have the second level, pulse width, or data value when the aircraft 12 is flying over an area in which a ground level sonic boom is permitted. The processing element 22 sets the level, pulse width, or data value of the apparatus signal to have the third level, pulse width, or data value when the aircraft 12 is approaching a boundary between a first area in which a ground level sonic boom is not permitted and a second area in which a ground level sonic boom is permitted.

As shown in block 308, the processing element next sends the electronic apparatus signal to the aircraft shape change apparatus. As shown in block 310, the aircraft shape change apparatus then adjusts a shape or other configuration of the aircraft to achieve the desired aircraft state called for by the electronic apparatus signal. Although discreet aircraft states are described herein, the aircraft shape change apparatus may incrementally change the shape or configuration of the aircraft to enable any number of shapes or configurations between the first shape or configuration and the second shape or configuration to gradually transition the shape or configuration of the aircraft when approaching or leaving locations that do not permit a sonic boom.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element 22 may comprise dedicated circuitry or logic that is permanently configured, such as an application-specific integrated circuit (ASIC), or indefinitely configured, such as an FPGA, to perform certain operations. The processing element 22 may also comprise programmable logic or circuitry (e.g., as encompassed within a general-purpose processor or other programmable processor) that is temporarily configured by software to perform certain operations. It will be appreciated that the decision to implement the processing element 22 as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element 22 comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of exemplary methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A system to actively trade drag for sonic boom suppression of an aircraft while in supersonic flight, the system comprising:
   an aircraft shape change apparatus configured to control a shape of the aircraft while in flight to have a first shape for reducing the sonic boom at ground level, to have a second shape for reducing drag on the aircraft, and to have a third shape that is in between the first shape and the second shape, the aircraft shape change apparatus to control the shape of the aircraft by changing an area distribution of structures of the aircraft; and
   machine-readable instructions;
   at least one processor to execute the machine-readable instructions to:
      cause the aircraft shape change apparatus to change the aircraft to the first shape when the aircraft is flying over a first area in which a ground level sonic boom is not permitted,
      cause the aircraft shape change apparatus to change the aircraft to the second shape when the aircraft is flying over a second area in which a ground level sonic boom is permitted; and
      cause the aircraft shape change apparatus to change the aircraft to the third shape when the aircraft is approaching a border between the first and second areas, wherein the aircraft is maintained in the third shape until the aircraft reaches the second area.

2. The system of claim 1, wherein the aircraft shape change apparatus includes shaped metal alloys.

3. The system of claim 1, wherein the aircraft shape change apparatus includes blade seals.

4. The system of claim 1, wherein the aircraft shape change apparatus includes at least one mechanism to apply mechanical forces to surfaces of the aircraft.

5. The system of claim 4, wherein the at least one mechanism includes one or more of an actuator, a motor, a cam, a hydraulic component or a pneumatic component to apply the mechanical forces to a nose section of the aircraft.

6. The system of claim 1, wherein the aircraft shape change apparatus is to change a degree of bluntness of the aircraft.

7. The system of claim 1, wherein the at least one processor is to cause the aircraft shape change apparatus to change the aircraft to the third shape when the aircraft is approaching or located at a border between the first and second area.

8. The system of claim 1, wherein the at least one processor is to receive data indicating whether a location of the aircraft corresponds to the first area, the second area or the third area.

9. The system of claim 1, wherein the at least one processor is to determine whether the aircraft is located in the first area, the second area or the third area.

10. The system of claim 1, wherein the aircraft shape change apparatus is to change the area distribution by increasing a first surface area of a first portion of the aircraft and decreasing a second surface area of a second portion of the aircraft.

11. The system of claim 1, wherein the aircraft shape change apparatus is to receive a first signal to change the aircraft to the first shape, wherein the aircraft shape change apparatus is to receive a second signal to change the aircraft to the second shape, and wherein the aircraft shape change apparatus is to receive a third signal to change the aircraft to the third shape.

12. A system to configure an aircraft while in flight, the system comprising:
   an aircraft shape change apparatus configured to control a shape of the aircraft while in flight, the aircraft shape change apparatus to control the shape of the aircraft by changing an area distribution of structures of the aircraft; and
   a flight management controller configured to instruct the aircraft shape change apparatus to adjust the shape of the aircraft to a first shape when the aircraft is flying over an area in which a ground level sonic boom is not permitted, to a second shape when the aircraft is flying over an area in which a ground level sonic boom is permitted, and to a third shape that is between the first and second shapes when the aircraft is approaching a border between the first and second areas, wherein the aircraft is maintained in the third shape until the aircraft reaches the second area.

13. The system of claim 12, wherein the border includes a span of distance between the area in which a ground level sonic boom is not permitted and the area in which a ground level sonic boom is permitted.

14. The system of claim 12, wherein the third shape corresponds to a first bluntness of a nose of the aircraft between a second degree of bluntness of the nose corresponding to the first shape and a third degree of bluntness of the nose corresponding to the second shape.

15. The system of claim 12, wherein the aircraft shape change apparatus includes shaped metal alloys.

16. The system of claim 12, wherein the aircraft shape change apparatus includes blade seals.

17. The system of claim 12, wherein the aircraft shape change apparatus includes at least one mechanism to apply mechanical forces to surfaces of the aircraft.

18. The system of claim 17, wherein the at least one mechanism includes one or more of an actuator, a motor, a cam, a hydraulic component or a pneumatic component to apply the mechanical forces to a nose section of the aircraft.

19. A method of morphing an aircraft while the aircraft is in flight, the method comprising:
   receiving data representative of a sonic boom property of an area over which the aircraft is flying;
   determining, with a processor, a desired aircraft state based on the sonic boom property of the area; and
   instructing, with the processor, an aircraft shape change apparatus to adjust a shape of the aircraft to achieve the desired aircraft state, the aircraft shape change apparatus to adjust the shape to a first shape when the aircraft is flying over an area in which a ground level sonic boom is not permitted, to a second shape when the aircraft is flying over an area in which a ground level sonic boom is permitted, and to a third shape that is between the first and second shapes when the aircraft is approaching a border between the first and second areas, wherein the aircraft is maintained in the third shape until the aircraft reaches the second area.

20. The method of claim 19, wherein the aircraft shape change apparatus includes shaped metal alloys.

* * * * *